US012720296B2

(12) United States Patent
Garcia Martin et al.

(10) Patent No.: US 12,720,296 B2
(45) Date of Patent: Aug. 25, 2026

(54) METHODS AND DEVICES FOR PERFORMING SERVICE SUBSCRIPTIONS

(71) Applicant: Telefonaktiebolaget LM Ericsson (publ), Stockholm (SE)

(72) Inventors: Miguel Angel Garcia Martin, Pozuelo de Alarcon (ES); David Castellanos Zamora, Madrid (ES); Emiliano Merino Vazquez, Madrid (ES); Pablo Acevedo Montserrat, Galapagar (ES); Juying Gan, Shanghai (CN); Yunjie Lu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 634 days.

(21) Appl. No.: 18/245,049

(22) PCT Filed: Sep. 21, 2020

(86) PCT No.: PCT/CN2020/116605
§ 371 (c)(1),
(2) Date: Mar. 13, 2023

(87) PCT Pub. No.: WO2022/056931
PCT Pub. Date: Mar. 24, 2022

(65) Prior Publication Data

US 2023/0354007 A1 Nov. 2, 2023

(51) Int. Cl.
*H04W 8/18* (2009.01)
*H04W 48/18* (2009.01)

(52) U.S. Cl.
CPC ............. *H04W 8/18* (2013.01); *H04W 48/18* (2013.01)

(58) Field of Classification Search
CPC ......... H04W 48/18; H04W 8/00; H04W 8/18; H04W 88/14; H04W 28/00; H04W 72/00;
(Continued)

(56) References Cited

U.S. PATENT DOCUMENTS

2007/0072605 A1 3/2007 Poczo
2020/0084743 A1 3/2020 Fernandez Galmes et al.
(Continued)

FOREIGN PATENT DOCUMENTS

CN 102017709 A 4/2011
CN 109547231 A 3/2019
(Continued)

OTHER PUBLICATIONS

Chinese Office Action dated Sep. 9, 2024 and summary English translation of the Chinese Office Action issued in corresponding Chinese Application No. 202080105335.3, consisting of 13 pages.
(Continued)

*Primary Examiner* — Timothy X Pham
(74) *Attorney, Agent, or Firm* — Weisberg I.P. Law, P.A.

(57) ABSTRACT

The present disclosure provides a method for a first network element in a communication network to perform service subscriptions for a UE. The method includes: in response to receiving a request comprising service subscription information for the UE from a second network element serving the UE and assisting in the service, cross referencing the service subscription information for the UE in the request with stored service subscription information for the UE for consistency; and in response to being not consistent, initiating updating of service subscriptions for the UE in the second network element according to the stored service subscription information for the UE. Corresponding devices, computer readable storage medium, carrier, etc. are also provided.

17 Claims, 10 Drawing Sheets

(58) Field of Classification Search
CPC ....... H04W 88/00; H04W 4/00; H04W 16/00; H04W 64/00
See application file for complete search history.

(56) References Cited

U.S. PATENT DOCUMENTS

| | | | | |
|---|---|---|---|---|
| 2021/0007042 | A1* | 1/2021 | Zhu | H04W 60/06 |
| 2021/0211859 | A1* | 7/2021 | Zhu | H04W 48/16 |
| 2023/0080510 | A1* | 3/2023 | Fernandez Alonso | H04W 8/18<br>455/435.1 |

FOREIGN PATENT DOCUMENTS

| | | | |
|---|---|---|---|
| CN | 109699072 | A | 4/2019 |
| CN | 109936843 | A | 6/2019 |
| CN | 111386719 | A | 7/2020 |
| CN | 111684826 | A | 9/2020 |
| EP | 3592012 | A1 | 8/2020 |
| WO | 2019073070 | A1 | 4/2019 |
| WO | 2020003576 | A1 | 1/2020 |

OTHER PUBLICATIONS

3GPP TS 23.502 V15.11.0 (Sep. 2020) 3rd Generation Partnership Project; Technical Specification Group Services and System Aspects; Procedures for the 5G System (5GS); Stage 2 (Release 15), consisting of 364 pages.

International Search Report and Written Opinion dated Jun. 23, 2021 for International Application No. PCT/CN2020/116605 filed Sep. 21, 2020, consisting of 7 pages.

3GPP TR 23.724 V2.0.0; 3rd Generation Partnership Project; Technical Specification Group Services and System Aspects; Study on Cellular IoT support and evolution for the 5G System (Release 16); Dec. 2018, consisting of 5 pages.

3GPP TS 23.501 V16.5.0; 3rd Generation Partnership Project; Technical Specification Group Services and System Aspects; System architecture for the 5G System (5GS); Stage 2 (Release 16); Jul. 2020, consisting of 441 pages.

3GPP TS 23.502 V16.5.0; 3rd Generation Partnership Project; Technical Specification Group Services and System Aspects; Procedures for the 5G System (5GS); Stage 2 (Release 16); Jul. 2020, consisting of 594 pages.

3GPP TS 29.518 V16.4.0; 3rd Generation Partnership Project; Technical Specification Group Core Network and Terminals; 5G System; Access and Mobility Management Services; Stage 3 (Release 16); Jun. 2020, consisting of 251 pages.

Chinese Office Action and English Translation dated Apr. 12, 2024 for Application No. 202080105335.3, consisting of 16 pages.

SA WG2 Meeting #122bis S2-176492; Title: 23.502: Update PDU Session Establishment flow for QoS-related subscription data; Source: CATT; Document for: Approval; Agenda Item: 6.5.3; Date and Location: Aug. 21-25, 2017, Sophia Antipolis, France, consisting of 11 pages.

3GPP TSG-SA WG2 Meeting #131 S2-1901862; Title: EPS bearer synchronization when move from EPC to 5GC (Network deletes bearer locally); Source to WG: Huawei, Hisillicon; Date and Location: Feb. 25-Mar. 1, 2019, Santa Cruz—Tenerife, Spain, consisting of 11 pages.

3GPP TSG-SA WG2 Meeting #131 S2-1902648; Title: EPS bearer synchronization when move from EPC to 5GC(UE deletes the bearer locally); Source to WG: Huawei, Hisillicon; Date and Location: Feb. 25-Mar. 1, 2019, Santa Cruz—Tenerife, Spain, consisting of 6 pages.

Chinese Notice of Allowance and English Translation dated Jan. 1, 2025 for Application No. 202080105335.3, consisting of 11 pages.

European Search Report dated May 31, 2024 for Application No. 20953789.3, consisting of 12 pages.

* cited by examiner

METHODS AND DEVICES FOR PERFORMING SERVICE SUBSCRIPTIONS

CROSS-REFERENCE TO RELATED APPLICATION

This application is a Submission Under 35 U.S.C. § 371 for U.S. National Stage Patent Application of International Application Number: PCT/CN2020/116605, filed Sep. 21, 2020 entitled "METHODS AND DEVICES FOR PERFORMING SERVICE SUBSCRIPTIONS," the entirety of which is incorporated herein by reference.

TECHNICAL FIELD

The present disclosure generally relates to the technical field of communications, and particularly, to methods, devices, computer-readable storage and carrier, etc. for performing service subscriptions.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

3GPP TS 23.501 and 23.502 lay down an event exposure architecture for 5GC (the $5^{th}$ Generation Core), where a few network functions, such as UDM (Unified Data Management), AMF (Access and Mobility Management Function), SMF (Session Management Function), and PCF (Policy Control Function) implement an interface to exfiltrate data to interested parties. This is the so-called Network Event Exposure technology, which is based on a consumer making subscriptions to certain UE-related events at a NF (Network Function), and receiving subsequent notifications related to that subscribed event.

In particular, 3GPP TS 23.502 in clause 4.15.3.2.3, defines a mechanism whereby a subscriber of Event Exposure, such as NEF (Network Exposure Function), subscribes, at UDM, to events related to access, mobility, and session, for a particular UE. FIG. 1, which is extracted from 3GPP TS 23.502, illustrates the concept, where problems may arise.

SUMMARY

It is objects of the present disclosure to address one or more of the problems arisen in service subscriptions.

According to one embodiment of the disclosure, there is provided a method for a first network element in a communication network to perform service subscriptions for a user equipment, UE, comprising: in response to receiving a request comprising for the UE from a second network element serving the UE and assisting in the service, cross referencing the service subscription information for the UE in the request with stored service subscription information for the UE for consistency; and in response to the service subscription information for the UE in the request and the stored service subscription information for the UE being not consistent, initiating updating of service subscriptions for the UE in the second network element according to the stored service subscription information for the UE.

According to a second embodiment of the disclosure, there is provided a method for a network element serving a user equipment, UE, in a communication network to perform service subscriptions for the UE, comprising: sending a request comprising service subscription information for the UE to another network element; and in response to receiving service subscriptions for the UE from the another network element, updating service subscriptions for the UE in the network element according to the received service subscriptions for the UE.

According to a third embodiment of the disclosure, there is provided a network element, operative in a communication network to perform service subscription for a user equipment, UE, comprising: a cross referencing component, configured to, in response to receiving a request comprising service subscription information for the UE from a second network element serving the UE and assisting in the service, check the service subscription information for the UE in the request with stored service subscription information for the UE for consistency; and an initiating component, configured to, in response to the service subscription information for the UE in the request and the stored service subscription information for the UE being not consistent, initiate updating of service subscriptions for the UE in the second network element according to the stored service subscription information for the UE.

According to a fourth embodiment of the disclosure, there is provided a network element serving a user equipment, UE, in a communication network to perform service subscriptions for the UE, comprising: a sending component, configured to send a request comprising service subscription information for the UE to another network element; and an updating component, configured to, in response to receiving service subscriptions for the UE from the another network element, update service subscriptions for the UE in the network element according to the received service subscriptions for the UE.

According to a fifth embodiment of the disclosure, there is provided a communication device in a network, comprising: a storage adapted to store instructions therein and a processor adapted to execute the instructions to cause the communication device to perform the steps of any of the methods here.

According to a sixth embodiment of the disclosure, there is provided one or more computer-readable storage storing computer-executable instructions thereon, when executed by a computing device, causing the computing device to implement the method of any of any of the methods here.

According to a seventh embodiment of the disclosure, there is provided a computer program, comprising instructions which, when executed on at least one processor, cause the at least one processor to carry out the method according to any one of the methods here.

According to an eighth embodiment of the disclosure, there is provided a carrier containing the computer program of the eighth embodiment, wherein the carrier is one of an electronic signal, optical signal, radio signal, or computer readable storage.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

FIG. 4*b* illustrates a flowchart of a method for a second network element serving a UE in a communication network to perform service subscriptions for the UE according to embodiments of the present disclosure.

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, concepts of AMF, UDM, NEF, etc. are generally understood in the context of 3GPP specifications. Though many embodiments herein are described in the context of 5G or 5G in combination with 4G, other networks may also be applicable.

Even though many embodiments are described in the context of event exposure subscriptions, it is noted that embodiments of the present disclosure are not limited to event exposure subscription, but also applicable to other service subscriptions as appropriate.

Figure 1:
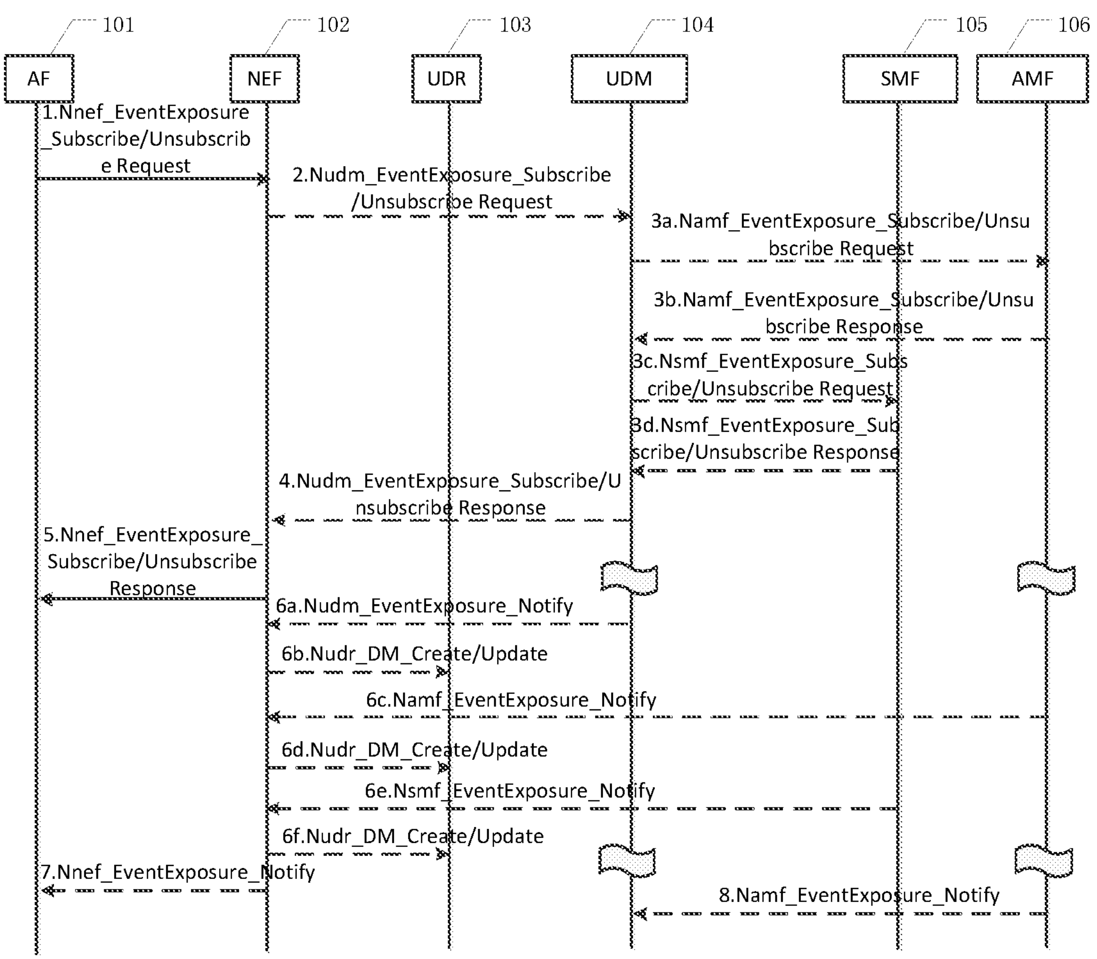
FIG. 1 illustrates subscriptions to event exposure at a UDM in the prior art.

FIG. 1 illustrates subscriptions to event exposure at a UDM in the prior art. At step 1, the AF (Application Function) subscribes to one or several Event(s) (identified by Event ID) and provides the associated notification endpoint of the AF by sending Nnef_EventExposure_Subscribe request. Event Reporting Information defines the type of reporting requested (e.g. one-time reporting, periodic reporting or event based reporting, for Monitoring Events). If the reporting event subscription is authorized by the NEF, the NEF records the association of the event trigger and the requester identity. The subscription may also include Maximum number of reports and/or Maximum duration of reporting IE.

At step 2, (this step is conditional, depending on authorization in step 1), the NEF subscribes to received Event(s) (identified by Event ID) and provides the associated notification endpoint of the NEF to UDM by sending Nudm_EventExposure_Subscribe request. The NEF maps the AF-Identifier into DNN and S-NSSAI combination based on local configuration, and includes DNN, S-NSSAI in the request. If the reporting event subscription is authorized by the UDM, the UDM records the association of the event trigger and the requester identity. Otherwise, the UDM continues in step 4 indicating failure.

At step 3*a*, which is also conditional, if the requested event (e.g. monitoring of Loss of Connectivity) requires AMF assistance, then the UDM sends the Namf_EventExposure_Subscribe to the AMF serving the requested user. The UDM sends the Namf_EventExposure_Subscribe request to the all serving AMF(s) (if subscription applies to a UE or a group of UE(s)), or all the AMF in the same PLMN as the UDM (if subscription applies to any UE). As the UDM itself is not the Event Receiving NF, the UDM shall additionally provide the notification endpoint of itself besides the notification endpoint of NEF. Each notification endpoint is associated with the related (set of) Event ID(s). This is to assure the UDM can receive the notification of subscription change related event. If the subscription applies to a group of UE(s), the UDM shall include the same notification endpoint of itself, i.e. Notification Target Address (plus Notification Correlation Id), in the subscriptions to all UE's serving AMF(s).

It is noted the same notification endpoint of UDM is to help the AMF identify whether the subscription for the requested group event is same or not when a new group member UE is registered.

At step 3*b*, which is conditional, AMF acknowledges the execution of Namf_EventExposure_Subscribe.

At step 3*c*, which is conditional, if the requested event (e.g. PDU Session Status) requires SMF assistance, then the UDM sends the Nsmf_EventExposure_Subscribe Request message to each SMF where at least one UE identified in step 2 has a PDU session established. The NEF notification endpoint received in step 2 is included in the message. It is noted that in the home routed case, the UDM sends the subscription to the V-SMF via the H-SMF.

At step 3*d*, which is conditional, the SMF acknowledges the execution of Nsmf_EventExposure_Subscribe.

At step 4, which is conditional, UDM acknowledges the execution of Nudm_EventExposure_Subscribe. If the subscription is applicable to a group of UE(s) and the Maximum number of reports is included in the Event Report information in step 1, the Number of UEs is included in the acknowledgement.

At step 5, NEF acknowledges the execution of Nnef_EventExposure_Subscribe to the requester that initiated the request.

At step 6*a*-6*b* (conditional depending on the Event) the UDM (depending on the Event) detects the event occurs and sends the event report, by means of Nudm_EventExposure_Notify message to the associated notification endpoint of the NEF along with the time stamp. NEF may store the information in the UDR along with the time stamp using either Nudr_DM_Create or Nudr_DM_Update service operation as appropriate.

At step 6*c*-6*d* (Conditional depending on the Event) the AMF detects the event occurs and sends the event report, by means of Namf_EventExposure_Notify message to associated notification endpoint of the NEF along with the time stamp. NEF may store the information in the UDR along with the time stamp using either Nudr_DM_Create or Nudr_DM_Update service operation as appropriate. If the AMF has a maximum number of reports stored for the UE or the individual member UE, the AMF shall decrease its value by one for the reported event. For both step 6*a* and step 6*b*, when the maximum number of reports is reached and if the subscription is applied to a UE, the NEF unsubscribes the monitoring event(s) to the UDM and the UDM unsubscribes the monitoring event(s) to AMF serving for that UE. For both step 6*a* and step 6*b*, when the maximum number of reports is reached for an individual group member UE, the NEF uses the Number of UEs received in step 4 to determine if reporting for the group is complete. If the NEF determines that reporting for the group is complete, the NEF unsubscribes the monitoring event(s) to the UDM and the UDM unsubscribes the monitoring event(s) to all AMF(s) serving the UEs belonging to that group. When the Maximum duration of reporting expires in the NEF, the UDM and the AMF, then each of these nodes shall locally unsubscribe the monitoring event.

At step 6*e*-6*f* (conditional depending on the Event), when the SMF detects a subscribed event, the SMF sends the event report, by means of Nsmf_EventExposure_Notify message, to the associated notification endpoint of the NEF provided in step 3*c*. NEF may store the information in the UDR along with the time stamp using either Nudr_DM_Create or Nudr_DM_Update service operation as appropriate.

At step 7 (conditional depending on the Event in steps 6*a*-6*f*), the NEF forwards to the AF the reporting event received by either Nudm_EventExposure_Notify and/or Namf_EventExposure_Notify. In the case of the PDU Session Status event, the NEF maps it to an PDN Connectivity Status notification when reporting to the AF.

At step 8 (Conditional depending on the Event), the AMF detects the subscription change related event occurs, e.g. Subscription Correlation ID change due to AMF reallocation or addition of new Subscription Correlation ID due to a new group UE registered, it sends the event report, by means of Namf_EventExposure_Notify message to the associated notification endpoint of the UDM.

As it can be understood from the previous description, if UDM receives a subscription for event exposure for a UE, and the event to be monitored requires assistance from either AMF, SMF or GMLC, then UDM is responsible for sending a subscription to those relevant network element for the required events.

When an Event Exposure subscription request is received at a UDM (step 2 in FIG. 1) and the UE is not currently attached in 5GC, no procedure exists in TS 23.502 for determining the actions that UDM takes. One possibility is that the subscription should be kept active in UDM, as long as the subscription's expiration time is not reached, independently of the registration status of the UE.

When an Event Exposure subscription request is received at a UDM (step 2 in FIG. 1), assuming that the UE is registered, the UDM verifies the list of AMFs and SMFs that are currently serving the UE, and sends subscriptions to each of them in case that the event requires to be reported by those network functions. The determination of the AMFs and SMFs that are serving the UE takes place at the time upon the subscription is received at the UDM. If at a later time, a new SMF is serving the UE (e.g., due to the activation of a new PDU session), the UDM does not follow these new SMFs, and the subscription is not fed by the data in such a new SMF.

3GPP TS 23.501 and 23.502 specify a procedure for an AMF transfer, which is the mechanism by which a UE being served by an initial AMF, due to UE mobility, eventually becomes served by a target AMF. During this AMF transfer procedure, the initial AMF sends, to the target AMF, the UE Context, including the current list of subscribed events being monitored. This allows the target AMF to continue reporting when these events occur.

Even in the presence of the UE context transfer between AMFs, a problem may occur when the AMF does not support the reporting of one or several events, or due to resources exhausted such as lack of internal memory, or due to limit for a given MTC (Machine Type Communications) provider reached (number of simultaneous events reached), etc.

Figure 2:
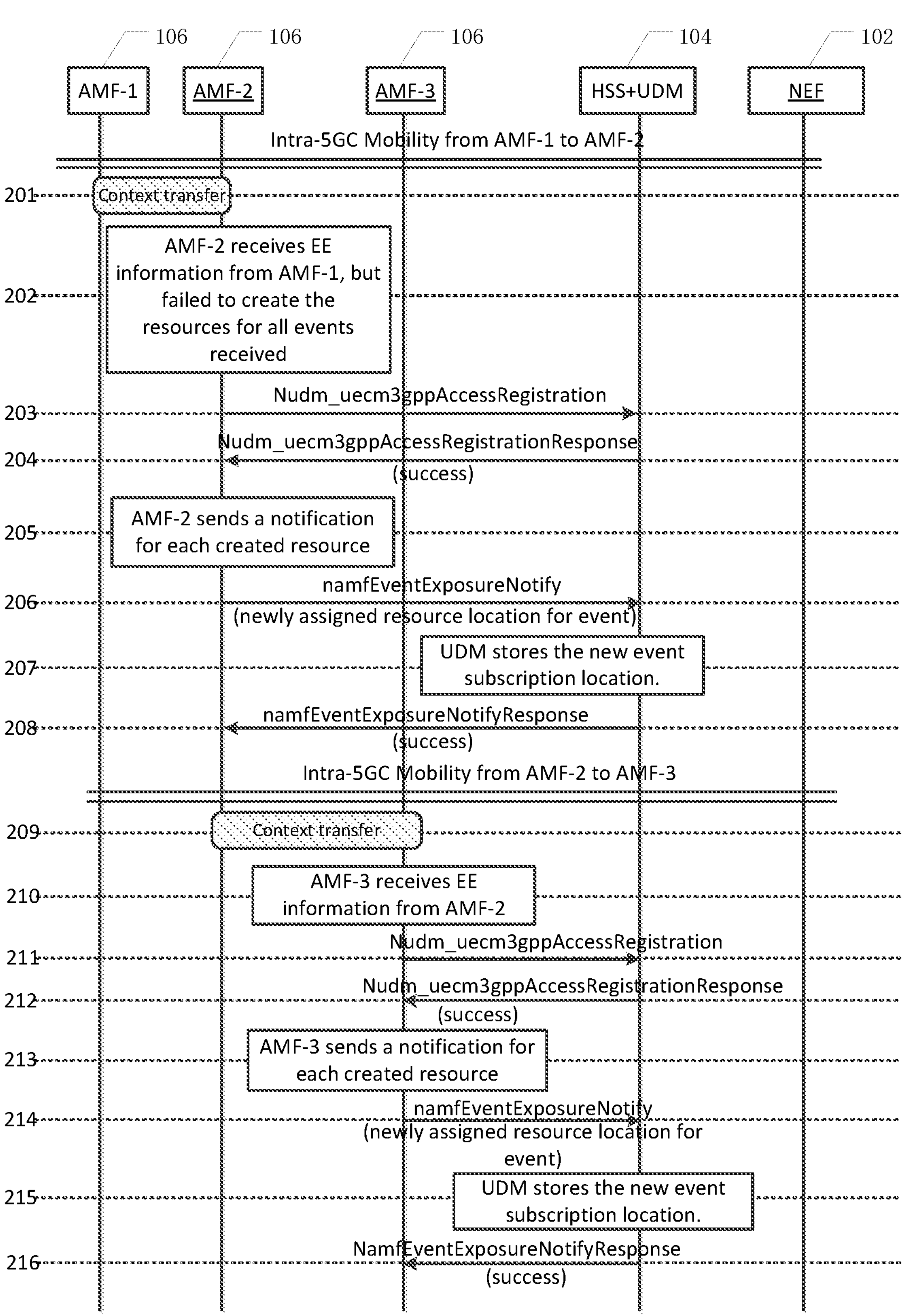
FIG. 2 illustrates a problem may arise due to UE mobility among AMFs.

FIG. 2 illustrates a scenario in which a problem may arise due to UE mobility among AMFs. The procedure in FIG. 2 may be divided into two stages of intra-5GC Mobility from AMF-1 to AMF-2 and intra-5GC Mobility from AMF-2 to AMF-3. In the stage of intra-5GC Mobility from AMF-1 to AMF-2 (steps/blocks 201-208), the AMF serving the UE has changed from AMF-1 to AMF-2. In a context transfer at step 201, AMF-2 receives EE (Event Exposure) subscription information from AMF-1, but fails to create the resources for all events received at block 202, due to lack of support, or due to resources exhausted such as lack of internal memory, or due to limit for a given MTC provider reached, etc.

Other scenarios are also possible. For example, assume that the AMF-1 supports event exposure for events 1 and 2. The UDM has received a subscription for events 1, 2, and 3, all of them requiring the reporting by the AMF-1. UDM sends a subscription to the AMF-1 for events 1, 2, and 3, but event 3 is not accepted due to lack of support. Then, at a later time, the UE context is transferred from AMF-1 to AMF-2, including the subscription for events 1 and 2. AMF-2 is lacking a subscription for event 3, even though it may support it, and it would not be able to provide notifications for this event 3. The consequence is that the consumer of event exposure is not getting notifications for event 3, because the AMF-2 is not aware of such a subscription.

It is noted that the UDM is generally combined with HSS (Home Subscriber Server) in 3GPP specifications. However, other scenarios are not excluded.

Then at step 203, AMF-2 registers with the UDM using e.g. Nudm_uecm3gppAccessRegistration message, and fulfills at step 204 with Nudm_uecm3gppAccessRegistrationResponse message. At block 205, AMF-2 sends a notification request for each created resource (i.e. for each event exposure subscription) to indicate to the UDM that now the event resource is located in a different AMF, using e.g. the namfEventExposureNotify message shown at step 206. Multiple subscriptions may require multiple notification requests. Then at block 207, the UDM stores the new event exposure subscription location. This is done for each notification received in 3GPP. Then the UDM acknowledges AMF-2 using e.g. namfEventExposureNotifyResponse message.

In the second stage of intra-5GC Mobility from AMF-2 to AMF-3 (steps/blocks 209-216), the AMF serving the UE has changed from AMF-2 to AMF-3. The process is similar to steps/blocks 201-208. As the EE subscription information received in the context transfer is incomplete (some events missing in the first stage as described above), the missing events are not monitored and the subscriptions are never resumed.

Figure 3:
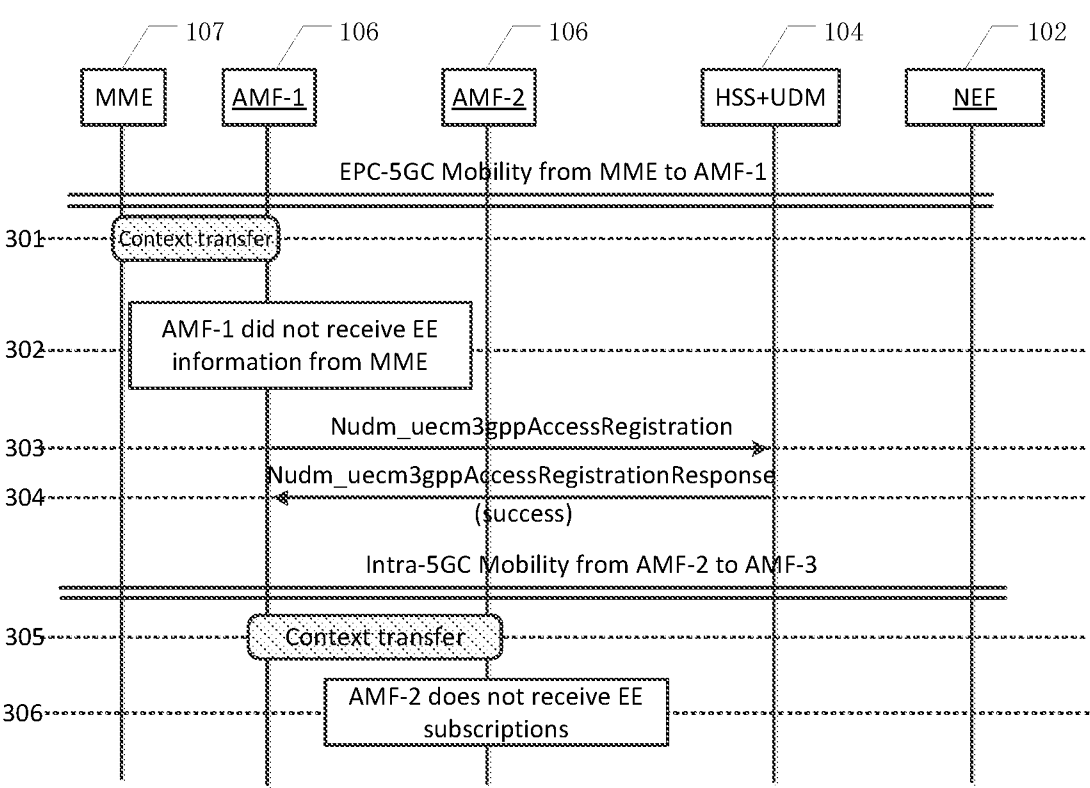
FIG. 3 illustrates a problem may arise due to UE mobility among networks.

Similar problems may also occur during UE mobility among networks. FIG. 3 illustrates such a scenario. The procedure in FIG. 3 may be divided into two stages of EPC (Evolved Packet Core)-5GC Mobility from MME (Mobility Management Entity) to AMF-2 and intra-5GC Mobility from AMF-1 to AMF-2. In the stage of EPC-5GC Mobility from MME to AMF-1 (steps/blocks 301-304), the mobility management network element serving the UE has changed from MME to AMF-1, the MME makes context transfer with AMF-1 via N26 interface (step 301). Since the MME does not transfer the exposure event subscriptions to AMF-1 (such information is not exchanged over N26 interface), AMF-1 does not receive EE subscription information in the context transfer at block 302, and thus there will be no event exposure subscription in the AMF-1. As a consequence, a consumer of event exposure would not receive notifications related to all the events that are of its interest. Then at step 303, AMF-1 registers with the UDM using e.g. Nudm_uecm3gppAccessRegistration message, and fulfills the registration at step 304 with Nudm_uecm3gppAccessRegistrationResponse message.

In the second stage of intra-5GC Mobility from AMF-1 to AMF-2 (steps/blocks 305-306), the AMF serving the UE has changed from AMF-1 to AMF-2. In the context transfer of step 305, as no EE subscription is available (due to no EE subscription being available in the first stage as described above), the events are not monitored and the subscriptions are never resumed.

It is noted that the procedures in FIG. 2 and FIG. 3 assume that steps 1-5 in FIG. 1 have occurred, and they are not shown in FIG. 2 and FIG. 3 any more for conciseness.

Figure 4A:
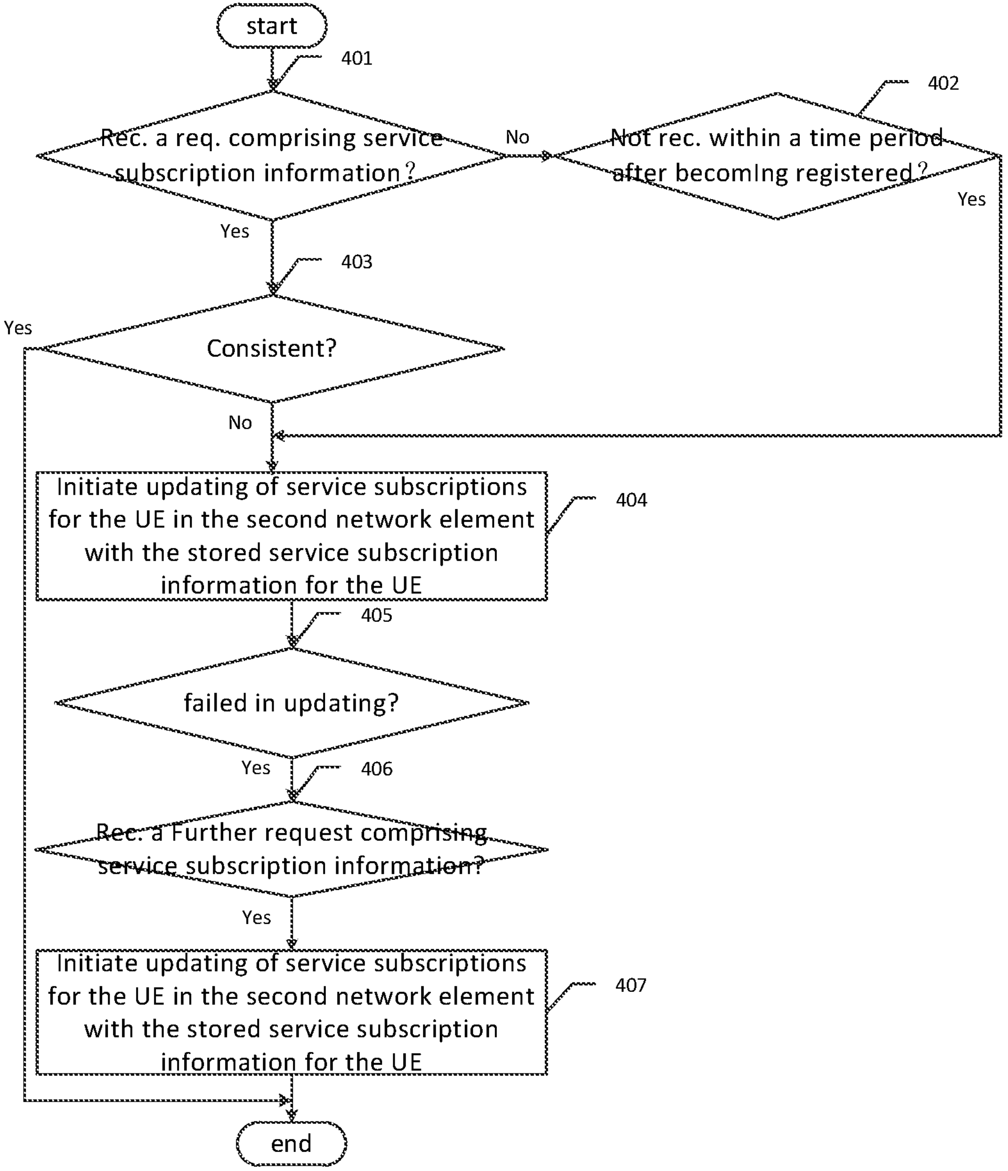
FIG. 4*a* illustrates a flowchart of a method for a first network element in a communication network to perform service subscriptions for a UE according to embodiments of the present disclosure.

FIG. 4*a* illustrates a flowchart of a method for a first network element in a communication network to perform service subscriptions for a UE according to embodiments of the present disclosure.

In which in response to receiving a request comprising service subscription information for the UE from a second network element serving the UE and assisting in the service determined at step 401, the first network element cross references the service subscription information for the UE in the request with stored service subscription information for the UE for consistency at step 403. The service subscription information in the request may indicate that no service subscriptions are available in the second network element, or may indicate ongoing service subscriptions subscribed at the second network. In response to the service subscription information for the UE in the request and the stored service subscription information for the UE being not consistent as determined at step 403, the first network element initiates updating of service subscriptions for the UE in the second network element according to the stored service subscription information for the UE at step 404.

Optionally or additionally, if it is determined at step 405 that the first network element has at least partly failed in the updating, the first network element directly initiates the updating at step 407 in response to receiving a further request comprising service subscription information for the UE as determined at step 406. The further request may not necessarily come from the second network element. In such a case, the first network element has known that at least part of the services is missing in the second network element, so it does not need to check for consistency in UE mobility before the next initiating of the updating of the service subscriptions.

Optionally or additionally, the service subscription information in the request indicates that the second network element does not have service subscriptions for the UE. In an example, the request is a registration request for the second network element to register with the first network element, such as Nudm_uecm3gppAccessRegistration message.

Optionally or additionally, the service subscription information in the request indicates service subscriptions for the UE in the second network element. In an example, the request is a notification request for the second network element to notify the first network element, such as namfEventExposureNotify message. Optionally or additionally, the notification request comprises all service subscription for the UE, each comprising a unique identifier for a respective subscription, an internal resource address, and one or more unique identifiers for respective services of the respective subscription.

Optionally or additionally, the initiating of step 404 further comprises: sending all service subscriptions for the UE comprised in the stored service subscription information to the second network element for service subscribing in the second network element. Accordingly, the updating comprises: deleting all service subscriptions for the UE in the second network element in case there are service subscriptions for the UE in the second network element, and adding all service subscriptions from the stored service subscription information for the UE to the second network element, i.e., subscribing the services from the stored service subscription information for the UE in the second network element. A further detailed embodiment will be shown in FIGS. 5*b* and 5*d*.

Optionally or additionally, the initiating of step 404 further comprises: sending difference of the service subscription information for the UE in the request and the stored service subscription information for the UE to the second network element for service subscription modifying. Accordingly, the updating comprises: deleting service subscriptions in the second network element that are not consistent with the stored service subscription information in case there are service subscriptions in the second network element that are not consistent with the stored service subscription information, and adding service subscriptions in the stored service subscription information for the UE that do not exist in the second network element to the second network element, i.e., modifying the service subscriptions for the UE in the second network element. A further detailed embodiment will be shown in FIGS. 5*a* and 5*c*.

Both way of initiating discussed above may be applied in response to either of the request. When the service subscription information in the request indicates service subscriptions for the UE in the second network element, service subscribing and service subscription modifying are both applicable. When the service subscription information in the request indicates that the second network element does not have service subscriptions for the UE, the service subscription modifying out of nothing is actually the same as the service subscription, Optionally or additionally, in response to not receiving the request within a time window (e.g. a few seconds) after the second network element becomes registered with the first network element as determined in step 402, directly initiate the updating at step 404.

In an example, the first network element is UDM, the second network element comprises one or more of the following: AMF, SMF, or GMLC (Gateway Mobile Location Center).

In an example, the service subscriptions are event exposure subscriptions, the stored service subscription information for the UE is stored in a UDR (Unified Data Repository).

In an example, the network is a 5G network, or a combination of a 5G network and 4G network, or any other appropriate network.

Optionally or additionally, service subscriptions in the stored service subscription information for the UE are kept active until they are expired. Given that the services can be active for months (as requested by NEF (Network Exposure Function), it might not be unusual that during such a period, events are lost and they are never restored in the network. In this way, as long as the service subscriptions are not expired, they are kept active in the stored service subscription information to support the UDM for updating service subscriptions in other network elements such as AMF, etc.

FIG. 4*b* illustrates a flowchart of a method for a second network element serving a UE in a communication network to perform service subscriptions for the UE according to embodiments of the present disclosure.

The method starts at step 401', in which a request comprising service subscription information for the UE is sent to a first network element; and then at step 402', in response to receiving service subscriptions for the UE from the first network element, service subscriptions for the UE in the second network element is updated according to the received service subscriptions for the UE.

In an example, the updating comprising: modifying service subscriptions for the UE in the second network element according to the received service subscriptions, or subscribing services for the UE in the second network element according to the received service subscriptions.

In an example, the request is a notification request for the second network element to notify the first network element, or the request is a registration request for the second network element to register with the first network element.

In an example, the first network element is UDM. In an example, the second network element comprises one or more of the following: AMF, SMF, or GMLC.

In an example, the service subscriptions are event exposure subscriptions.

In an example, the network is a 5G network, or a combination of a 5G network and 4G network, or any other appropriate network.

Based on the embodiments of FIG. 4*a* and FIG. 4*b*, the UDM is not only in charge of distributing these service subscription requests to the applicable serving network functions (e.g., AMF, SMF) currently registered in UDM when the subscription request is received from the consumer as per state of the art, but the UDM is also responsible for making the service subscriptions persistent across the network and the different serving NFs.

In one scenario, when a new NF registers in UDM for a given UE indicating that it does not have any service subscriptions, UDM verifies whether there are stored event subscriptions for this UE, for which the NF under registration (AMF, SMF) should provide assistance. In such a case, the UDM sends the required one or more service subscription request(s) for the relevant service(s) to that NF.

In another scenario, if the NF is already registered in the UDM, but the consumer is in purged state, the UDM will still send the subscription request for the relevant service(s) to that NF.

Details of the scenarios will be described below with reference to FIG. 5*a*-5*d*. In any scenario, the UDM may either delete all services and re-subscribe again to the NF, or may add/remove services or subscriptions which are not consistent with the stored service subscription information.

Figure 5A:
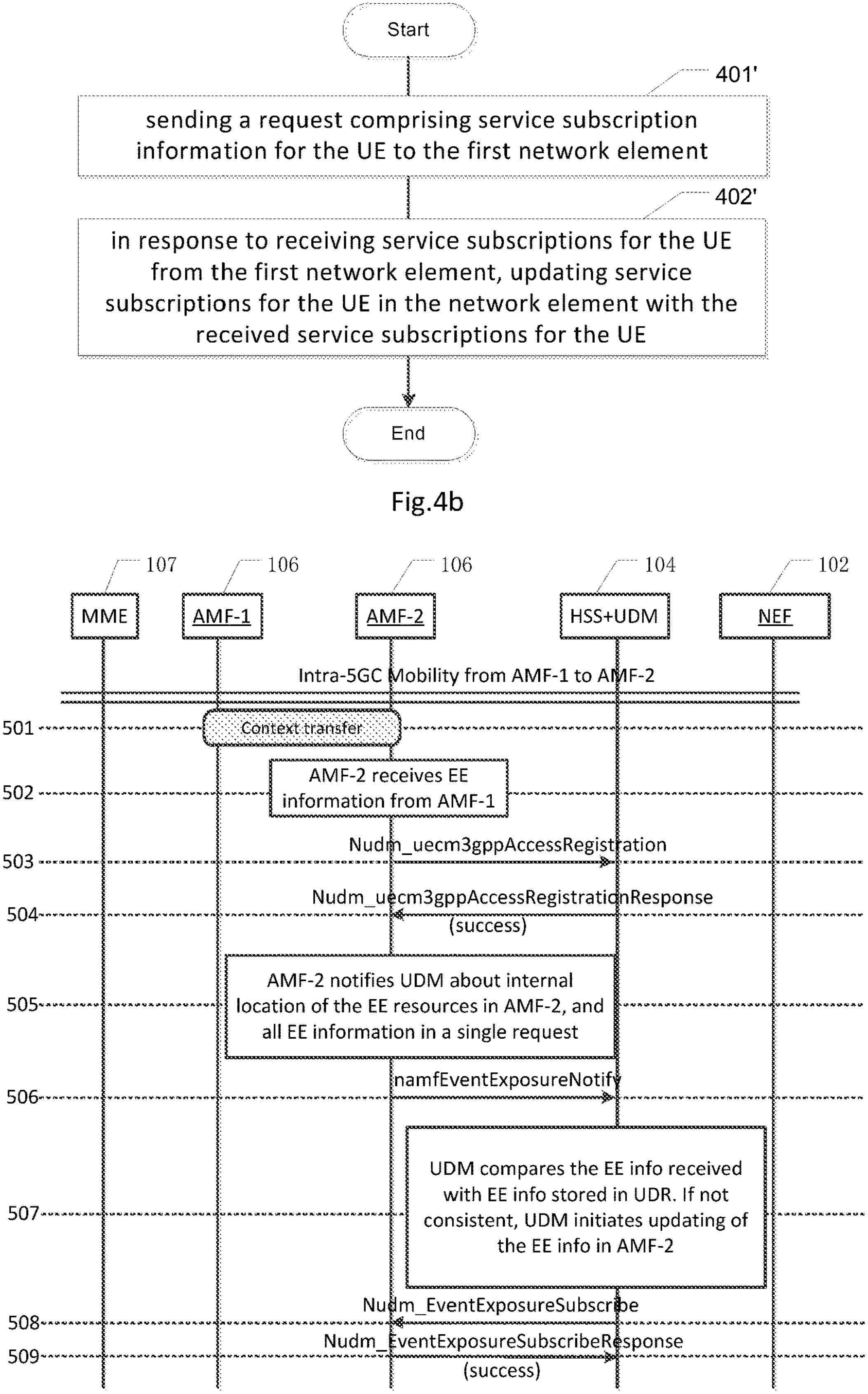
FIG. 5*a* illustrates a flowchart of a first detailed embodiment according to embodiments of the present disclosure.

FIG. 5*a* illustrates a flowchart of a first detailed embodiment according to the present disclosure, which is in a scenario of intra-5GC Mobility from AMF-1 to AMF-2.

At step 501, AMF-2 requests AMF-1 for context transfer, e.g., due to UE mobility, and the ongoing events subscribed (see steps 3*a*-3*b* in FIG. 1) are transferred from AMF-1 to AMF-2 as part of the context transfer. AMF-2 receives Event Exposure subscription information from AMF-1 at block 502. The received Event Exposure subscription information is incomplete due to, e.g. failure in a previous event(s) subscription(s) in AMF-1.

At steps 503-504, AMF-2 performs a registration in UDM as described above regarding steps 203-204.

At block 505 and step 506, AMF-2 notifies UDM about internal location of the Event Exposure resources in AMF-2, and all Event Exposure subscription information in a single notification request—namfEventExposureNotify message. The notification request can include multiple subscriptions, and each subscription includes a unique identifier, an internal resource address and unique identifier(s) of event(s. In this way, at block 507, the UDM can compare the Event Exposure information received from AMF-2 with the Event Exposure information previously stored for the same UE. If UDM detects either one or more event(s) subscription missing, or one or more event(s) missing in an existing subscription in the Event Exposure subscription information received from AMF-2, at step 508, UDM initiates updating of the Event Exposure subscription information in AMF-2 by sending e.g. Nudm_EventExposureSubscribe message. With reference to step 404 in FIG. 4*a*, the initiating may comprise sending all Event Exposure subscriptions for the UE comprised in the stored Event Exposure subscription information to AMF-2 for Event Exposure subscribing, or the initiating may comprise send the difference of the Event Exposure subscription information received and the stored Event Exposure subscription information for the UE to AMF-2 for Event Exposure subscription modifying. At step 509, AMF-2 acknowledges the updating by sending e.g. a Nudm_EventExposureSubscribeResponse message.

In this way, the Event Exposure subscription information is consistent across the network among e.g. NEF, UDM, AMF-2, etc.

Figure 5B:
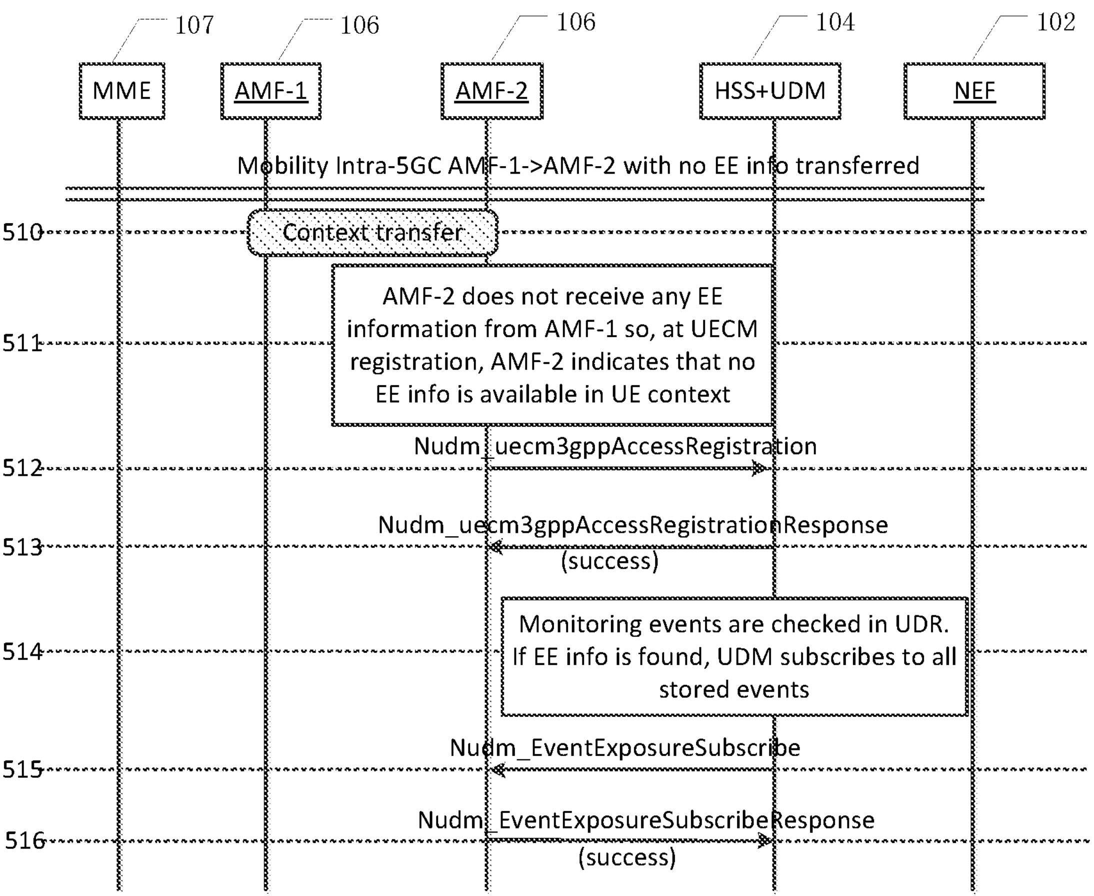
FIG. 5*b* illustrates a flowchart of a second detailed embodiment according to embodiments of the present disclosure.

FIG. 5*b* illustrates a flowchart of a second detailed embodiment according to embodiments of the present disclosure, which is in a scenario of intra-5GC Mobility from AMF-1 to AMF-2.

At step 510, AMF-2 requests AMF-1 for context transfer, e.g., due to UE mobility. However, no Event Exposure subscription is passed on from AMF-1 to AMF-2 as part of the context transfer due to, e.g. AMF-1 loosing data during a restart, and at block 502, AMF-2 does not receive any Event Exposure subscription information from AMF-1, and performs a registration with UDM. As part of the registration request such as a Nudm_uecm3gppAccessRegistration message at step 512, AMF-2 indicates that there are no ongoing Event Exposure subscriptions for the UE in AMF-2, and UDM acknowledges the registration request by send e.g. a Nudm_uecm3gppAccessRegistrationResponse message.

At block 514, upon reception of the indication that there are no ongoing Event Exposure subscriptions for the UE in AMF-2, UDM verifies whether event subscriptions should be active for the UE in UDR, and if there should be, UDM restores the Event Exposure subscriptions at steps 515-516. Details of the process can be found in the description of steps 3*a*-3*b* in FIG. 1.

In this way, the Event Exposure subscription information is consistent across the network among e.g. NEF, UDM, AMF-2, etc.

Figure 5C:
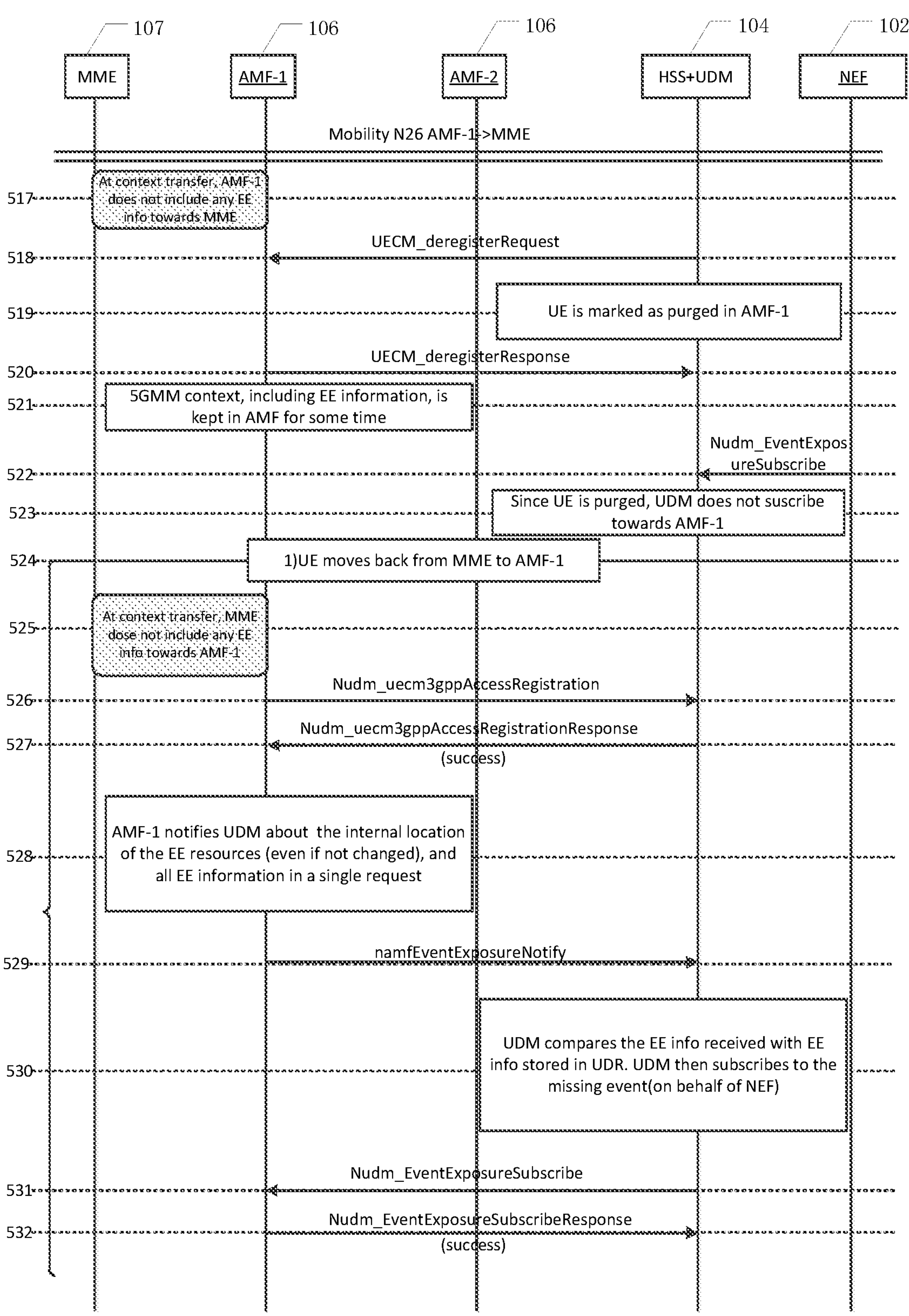
FIG. 5*c* illustrates a flowchart of a third detailed embodiment according to embodiments of the present disclosure.

FIG. 5*c* illustrates a flowchart of a third detailed embodiment according to embodiments of the present disclosure, which is in a scenario of EPC-5GC Mobility from AMF-1 to MME, and from MME to AMF-1.

Previous to step 517, the UE is registered and being served by AMF-1. One or more Event Exposure subscriptions are active for this UE at AMF-1.

At step 517, due to UE mobility, the UE becomes served by an MME in EPC. MME requests AMF-1 for context transfer. No Event Exposure subscription is passed on from AMF-1 to MME as part of the context transfer as the interface between MME and AMF-1 such as N26 interface does not support such information.

After MME's registration in HSS, UDM sends a deregistration request (e.g. UECM_deregisterRequest) to AMF-1 at step 518, and marks the UE as purged in AMF at block 519. AMF-1 may optionally keep the UE context (including Event Exposure subscriptions) during some time at block 521, so that if the UE moves back to AMF-1 in a short time, the UE context can be reused. AMF-1 acknowledges the deregistration request by sending a deregistration response (e.g. UECM_deregisterResponse) to UDM at step 520.

Then a new Event Exposure subscription occurs, being initiated by an entity external to 5G Core (not shown in FIG. 5*c*). As a consequence, NEF receives a request for an Event Exposure subscription. NEF requests UDM to subscribe to the received event, e.g., via Nudm_EventExposureSubscribe message at step 522. Since the UE is marked as purged in AMF-1, UDM does not subscribe to AMF-1.

Then at block 524, e.g., due to UE mobility, the UE becomes served again by AMF-1. Similarly, no Event Exposure subscription is passed on from MME to AMF-1 as part of the UE context transfer.

Then at steps 526-527, AMF-1 performs registration with UDM via e.g. Nudm_uecm3gppAccessRegistration message and Nudm_uecm3gppAccessRegistrationResponse message.

Even though there is a valid context with Event Exposure subscription information as a result of step 521, AMF-1 treats the mobility case as intra-5GC mobility scenario with respect to Event Exposure, that is, AMF-1 notifies UDM about the internal location of the Event Exposure resources (even if not changed), and all Event Exposure subscription information in a single notification request at block 528.

At step 529, AMF-1 notifies UDM about internal location of the EE resources in AMF-1, and all Event Exposure subscription information in a single notification request e.g. namfEventExposureNotify message. The notification request can include multiple subscriptions, and each subscription includes a unique identifier, an internal resource address and unique identifier(s) of event(s). In this way, at block 530, the UDM can compare the Event Exposure subscription information received from AMF-1 with the previously stored one. There is a discrepancy, since AMF-1 may be missing events subscribed by NEF while the UE was being served by MME. If UDM detects either one or more missing event(s) subscription, or one or more missing event(s) in an existing subscription in the Event Exposure subscription information received from AMF-1, at step 531, UDM initiates updating of the Event Exposure subscription information in AMF-1 by sending e.g. Nudm_EventExposureSubscribe message. With reference to step 404 in FIG. 4*a*, the initiating may comprise sending all Event Exposure subscriptions for the UE comprised in the stored Event Exposure subscription information to AMF-2 for Event Exposure subscribing, or the initiating may comprise send the difference of the Event Exposure subscription information received and the stored Event Exposure subscription information for the UE to AMF-2 for Event Exposure subscription modifying. At step 532, AMF-1 acknowledges the updating by sending e.g. a Nudm_EventExposureSubscribeResponse message.

In this way, the Event Exposure subscription information is consistent across the network among e.g. NEF, UDM, AMF-2, etc.

Figure 5D:
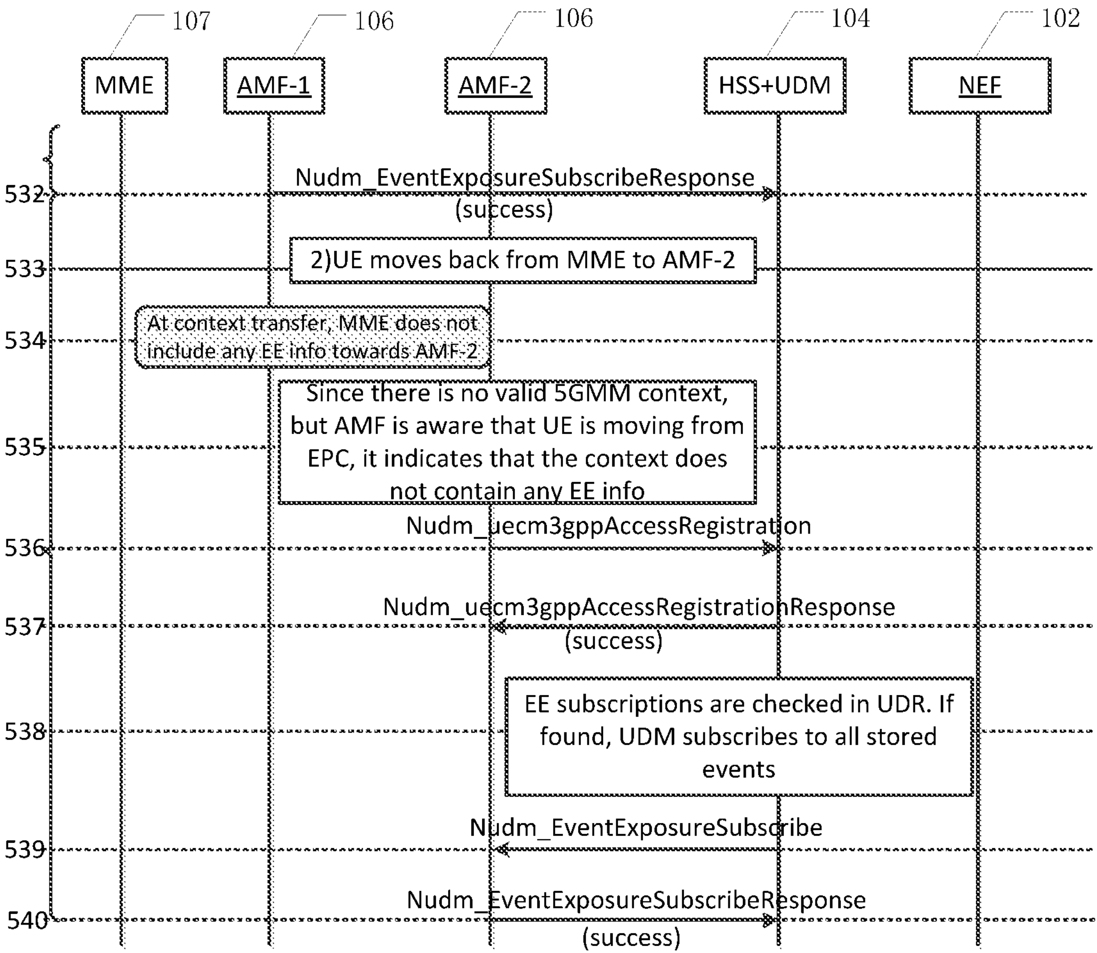
FIG. 5*d* illustrates a flowchart of a fourth detailed embodiment according to embodiments of the present disclosure.

FIG. 5*d* illustrates a flowchart of a fourth detailed embodiment according to embodiments of the present disclosure, which is in a scenario of EPC-5GC Mobility from MME to AMF-2.

Initially, and prior to block 532 in FIG. 5*d*, the UE is being served an MME of the EPC. The MME has created a UE context. One or more Event Exposure subscriptions are active for this UE.

Similar to FIG. 5*c*, the UE moves back from EPC to 5GC. When 5GC selects an AMF to serve the UE, due to location, mobility, or other aspects, 5GC selects a different AMF than the initial one. In this example the 5GC chooses AMF-2 to be serving the UE when it moves from MME, at block 533. At step 534, AMF-1 requests MME for UE context transfer. However, no Event Exposure subscription is passed on from MME to AMF-2 as part of the UE context transfer due to lack of this capability in N26 interface.

Since there is no valid 5G mobility management context, but AMF-2 is aware that UE is moving from EPC, AMF-2 indicates to UDM that the UE context does not contain any Event Exposure subscription information at block 535, via a registration request such as Nudm_uecm3gppAccessRegistration message at step 536. This triggers UDM to verify whether there are existing Event Exposure subscriptions stored in the UDR at block 538. The registration request is acknowledged at step 537 via e.g. Nudm_uecm3gppAccessRegistrationResponse message. If existing Event Exposure subscription information is found, UDM triggers subscription requests to all stored events (on behalf of NEF) at steps 539-540. Details of the process can be found in the description of steps 3*a*-3*b* in FIG. 1.

In this way, the Event Exposure subscription information is consistent across the network among e.g. NEF, UDM, AMF-2, etc.

Figure 6:
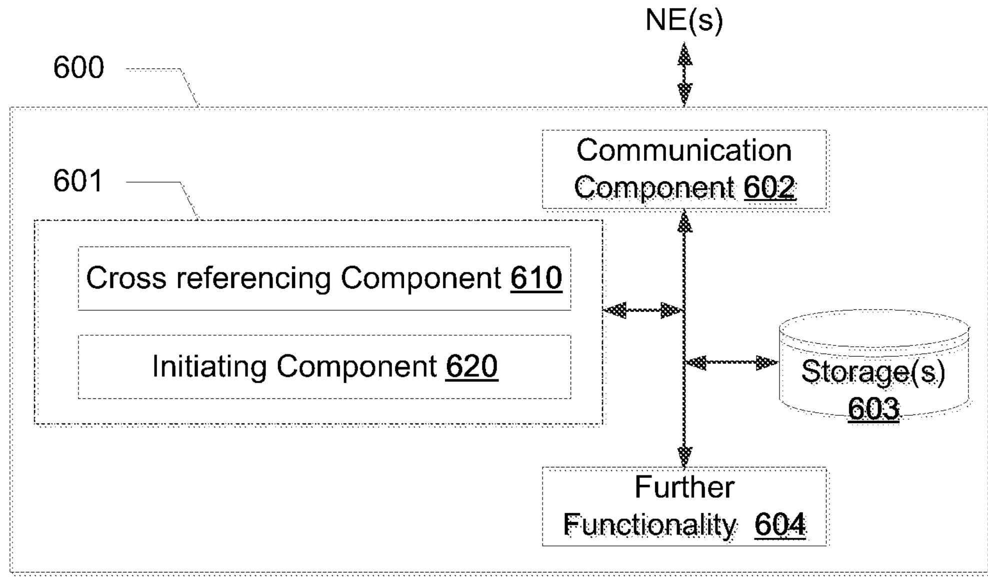
FIG. 6 illustrates a schematic block diagram of a first network element according to embodiments of the present disclosure.

FIG. 6 illustrates a schematic block diagram of a first network element according to embodiments of the present disclosure. The first network element is configured to perform service subscription for UEs. The network here may be a 5G network, a 5G network combined with a 4G network, or any other appropriate network.

The part of first network element 600 which is most affected by the adaptation of the herein described method, e.g., a part of the method 400, is illustrated as an arrangement 601, surrounded by a dashed line. The first network element and arrangement 601 may be further configured to communicate with other entities via a communication component 602 which may be regarded as part of the arrangement 601 (now shown). The communication component 602 comprises means for communication. The arrangement 601 or first network element may further comprise a further functionality 604, such as functional components providing regular UE functions, and may further comprise one or more storage(s) 603. External storages, such as UDR, are also possible, in which case the communication towards them are executed via the communication component 602.

The arrangement 601 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIGS. 4*a* and/or 4*b*. The arrangement 601 of the first network element may be implemented and/or described as follows.

Referring to FIG. 6, the first network element may comprise a cross referencing component 610 and an initiating component 620.

The cross referencing component 610 is configured to, in response to receiving a request comprising service subscription information for the UE from a second network element serving the UE and assisting in the service, check the service subscription information for the UE in the request with stored service subscription information for the UE for consistency.

The initiating component is configured to, in response to the service subscription information for the UE in the request and the stored service subscription information for the UE being not consistent, initiate updating of service subscriptions for the UE in the second network element according to the stored service subscription information for the UE.

Details on how to perform service subscriptions have been described with reference to FIGS. 4*a* and 4*b*, and will not be reiterated here.

It should be noted that two or more different units in this disclosure may be logically or physically combined. For example, the cross referencing component 610 and the initiating component 620 may be combined as one single unit.

Figure 7:
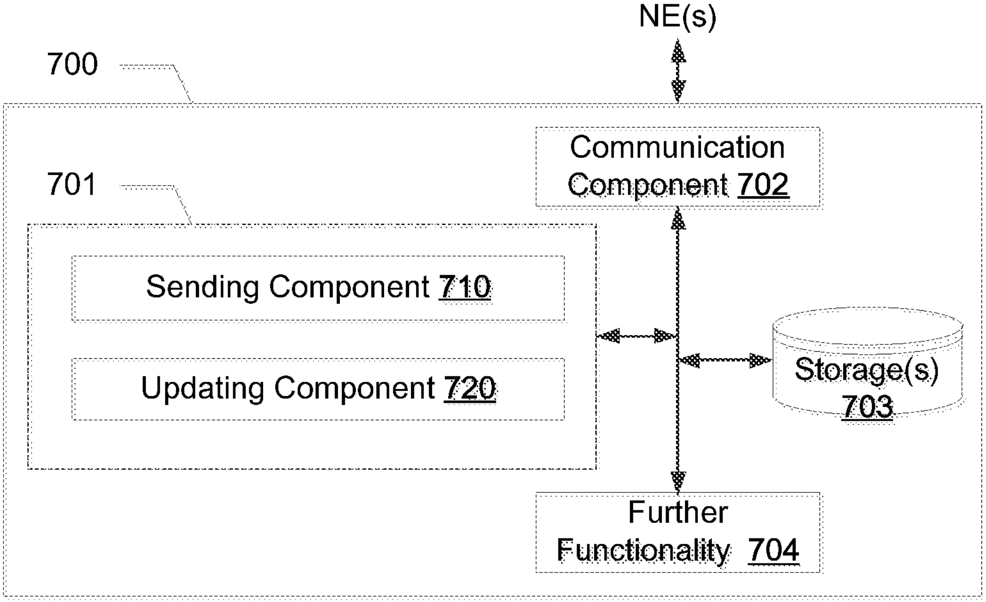
FIG. 7 illustrates a schematic block diagram of a second network element according to embodiments of the present disclosure.

FIG. 7 is a schematic block diagram of a second network element serving a UE in a communication network according to embodiments of the present disclosure. The second network element is configured to perform service subscriptions for the UE. The network here may be a 5G network, a 5G network in combination with a 4G network, or any other appropriate network.

The part of second network element 700 which is most affected by the adaptation of the herein described method, e.g., a part of the method 400', is illustrated as an arrangement 701, surrounded by a dashed line. The second network element and arrangement 701 are further configured to communicate with other entities such as the first network element via a communication component 702 which may be regarded as part of the arrangement 701. The communication component 702 comprises means for communication, and may also comprise means for, e.g., wired communication. The arrangement 701 or the second network element may further comprise a further functionality 704, such as functional components providing regular base station functions, and may further comprise one or more storage(3) 703.

The arrangement 701 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIG. 4*b*. The arrangement part of the second network element may be implemented and/or described as follows.

Referring to FIG. 7, the second network element may include a sending component 710, and an updating component 720.

The sending component 710 is configured to send a request comprising service subscription information for the UE to the first network element.

The updating component 720 is configured to, in response to receiving service subscriptions for the UE from the first network element, update service subscriptions for the UE in the network element according to the received service subscriptions for the UE.

It should be noted that two or more different units in this disclosure may be logically or physically combined. For example, the sending component 710 and the updating component 720 may be combined as one single unit.

Figure 8:
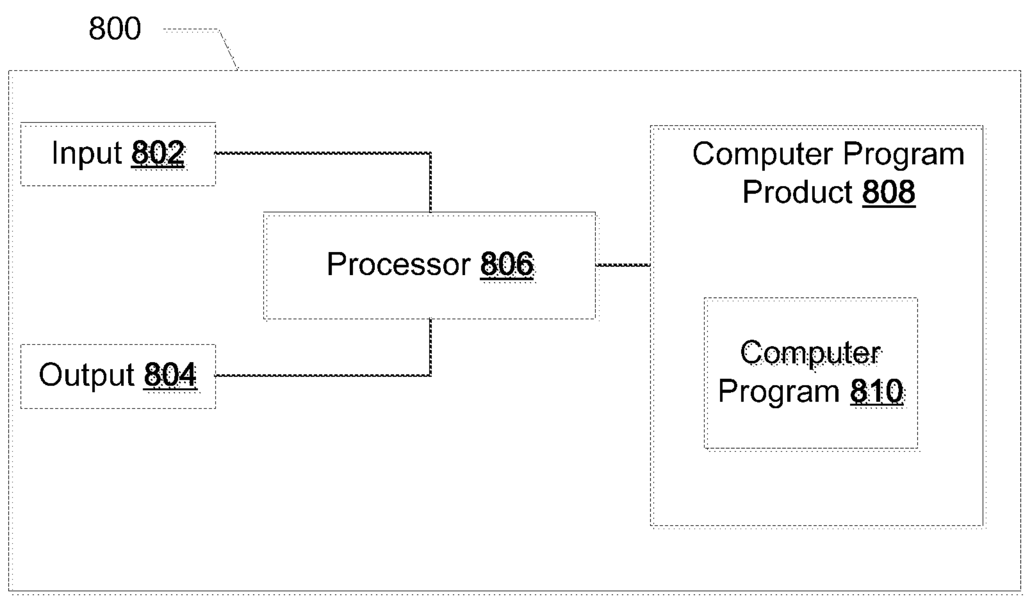
FIG. 8 schematically illustrates an embodiment of an arrangement which may be used for network elements of the present disclosure.

FIG. 8 schematically shows an embodiment of an arrangement 800 which may be used in the first network element or the second network element. Comprised in the arrangement 800 are here a processor 806, e.g., with a Digital Signal Processor (DSP). The processor 806 may be a single unit or a plurality of units to perform different actions of procedures described herein. The arrangement 800 may also comprise an input unit 802 for receiving signals from other entities, and an output unit 804 for providing signal(s) to other entities. The input unit and the output unit may be arranged as an integrated network element or as illustrated in the example of FIG. 6 or FIG. 7.

Furthermore, the arrangement 800 comprises at least one computer program product 808 in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processor 806 in the arrangement 800 causes the arrangement 800 and/or the first network element or the second network element in which it is comprised to perform the actions, e.g., of the procedure described earlier in conjunction with FIGS. 4*a*, 4*b* or FIGS. 5*a*, 5*b*, 5*c*, 5*d*.

The computer program 810 may be configured as a computer program code structured in computer program modules. Hence, in an exemplifying embodiment when the arrangement 800 is used in the first network element, the code in the computer program of the arrangement 800 when executed, will cause the processor 806 to perform the steps as described with reference to FIG. 4*a*.

In another exemplifying embodiment when the arrangement 800 is used in the second network element, the code in the computer program of the arrangement 800 when executed, will cause the processor 806 to perform the steps as described with reference to FIG. 4*b*.

The processor 806 may be a single Central Processing Unit (CPU), but could also comprise two or more processing units. For example, the processor 806 may include general purpose microprocessors, instruction set processors and/or related chip sets and/or special purpose microprocessors such as Application Specific Integrated Circuits (ASIC). The processor 806 may also comprise board memory for caching purposes. The computer program 810 may be carried by a computer program product 808 connected to the processor 806. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

As a whole or by scenario, service subscription information are kept in UDM and UDM becomes responsible for service subscription information updating at NF, service subscriptions are always ensured to have consistency across the network comprising e.g. AMFs and MMEs in spite of mobility scenarios. By allowing UDM to directly initiate the updating of service subscriptions at NFs after an update failure, and also allowing AMF to send a request comprising service subscription information (either indicating no service subscription or indicating active service subscriptions) flexibility is achieved. The updating of service subscriptions may be triggered by UDM or AMF. By allowing multiple subscriptions in one request (either notification request or registration request), efficiency is achieved While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a first network element in a communication network to perform service subscriptions for a user equipment, UE, comprising:

in response to receiving a request comprising service subscription information for the UE from a second network element serving the UE and assisting in the service, cross referencing the service subscription information for the UE in the request with stored service subscription information for the UE for consistency; and in response to the service subscription information for the UE in the request and the stored service subscription information for the UE being not consistent, initiating updating of service subscriptions for the UE in the second network element according to the stored service subscription information for the UE.

2. The method of claim 1, further comprising:

having at least partly failed in the updating, directly initiating the updating in response to receiving a further request comprising service subscription information for the UE.

3. The method of claim 1, wherein the service subscription information in the request indicates that the second network element does not have service subscriptions for the UE.

4. The method of claim 1, wherein the service subscription information in the request indicates service subscriptions for the UE in the first network element.

5. The method of claim 1, wherein the initiating further comprises: sending all service subscriptions for the UE comprised in the stored service subscription information to the second network element for service subscribing in the second network element.

6. The method of claim 1, wherein the initiating further comprises: sending differences of the service subscription information for the UE in the request and the stored service subscription information for the UE to the second network element for service subscription modifying in the second network element.

7. The method of claim 4, wherein the request comprises all service subscriptions for the UE in the first network element, each of the all service subscriptions comprising a unique identifier for a respective subscription, an internal resource address, and one or more unique identifiers for respective one or more services in the respective subscription.

8. The method of claim 1, the updating comprising:

deleting all service subscriptions for the UE in the second network element in case there are service subscriptions for the UE in the second network element, and adding all service subscriptions from the stored service subscription information for the UE to the second network element.

9. The method of claim 1, the updating comprising:

deleting service subscriptions in the second network element that are not consistent with the stored service subscription information in case there are service subscriptions in the second network element that are not consistent with the stored service subscription information; and adding service subscriptions in the stored service subscription information for the UE that do not exist in the second network element to the second network element.

10. The method of claim 3, wherein the request is a registration request for the second network element to register with the first network element.

11. The method of claim 4, wherein the request is a notification request for the second network element to notify the first network element.

12. The method of claim 11, further comprising:

in response to not receiving the request within a time period after the second network element becomes registered with the first network element, directly initiating the updating.

13. The method of claim 1, wherein the service subscriptions are event exposure subscriptions.

14. The method of claim 1, wherein one or both of:

the first network element is Unified Data Management, UDM, network element; and;

the stored service subscription information for the UE is stored in a Unified Data Repository, UDR, network element.

15. The method of claim 1, wherein service subscriptions in the stored service subscription information for the UE are kept active until they are expired.

16. The method of claim 1, wherein the second network element comprises one or more of the following: Access and Mobility Management Function, AMF, network element, Session Management Function, SMF, network element, or Gateway Mobile Location Center, GMLC, network element.

17. A communication device in a communication network, the communication device comprising:

a storage configured to store processor executable instructions therein; and a processor configured to execute the instructions to cause the communication device to:

in response to receiving a request comprising service subscription information for a UE from a second network element serving the UE and assisting in the service, cross reference the service subscription information for the UE in the request with stored service subscription information for the UE for consistency; and in response to the service subscription information for the UE in the request and the stored service subscription information for the UE being not consistent, initiate updating of service subscriptions for the UE in the second network element according to the stored service subscription information for the UE.

* * * * *